United States Patent [19]
Jiang

[11] Patent Number: 5,889,274
[45] Date of Patent: Mar. 30, 1999

[54] CARD READER STRUCTURE

[76] Inventor: Shyh-Biau Jiang, No. 12-3, Lane 191, Sec. 3, Ney Hwu Rd., Taipei, Taiwan

[21] Appl. No.: 851,766

[22] Filed: May 6, 1997

[51] Int. Cl.⁶ .................................................. G06K 19/06
[52] U.S. Cl. ........................................ 235/493; 235/449
[58] Field of Search ................................... 235/493, 499, 235/441, 486, 487, 492; 360/2, 106, 118; 33/109

[56] References Cited

U.S. PATENT DOCUMENTS

| | | | |
|---|---|---|---|
| 3,994,483 | 11/1976 | Perucchi et al. | 267/160 |
| 4,518,853 | 5/1985 | Babel et al. | 235/449 |
| 4,585,929 | 4/1986 | Brown et al. | 235/449 |
| 4,593,328 | 6/1986 | Baus, Jr. | 360/2 |
| 4,598,479 | 7/1986 | Baus | 33/129 |
| 4,731,685 | 3/1988 | Orcutt | 360/106 |
| 4,937,438 | 6/1990 | Warwick et al. | 235/446 |

*Primary Examiner*—Thien Minh Le
*Attorney, Agent, or Firm*—Pro-Techtor International Services

[57] ABSTRACT

A card reader includes a base having formed thereon two spaced walls defining therebetween a card slot through which a card is movable. Both of the walls have two openings formed thereon to be opposite to each other. A write transducer and a read transducer are respectively suspended by a first biasing member to be located within the openings of one of the walls. A dummy transducer is also suspended by a first biasing member within one of the openings of the other wall. The dummy and read transducers are opposite to each other so as to provide a force and position to the card moved through therebetween. A roller co-axially mounted to and rotatable in unison with an encoder is rotatably supported by a second biasing member within the other opening of the other wall to be opposite to the write transducer to provide a force and position to the card moved through therebetween. The second basing member has two opposite ends each fixed to the wall with an end securing device so as to allow the rotational axis of the roller to be moved relative to the wall in a direction normal to the movement of the card, but not in a direction parallel with the movement of the card. All the first biasing members have two ends secured to the respective wall to make the write, read and dummy transducers movable relative to the wall in a direction normal to the movement of the card, but not in a direction parallel with the movement of the card.

13 Claims, 7 Drawing Sheets

CARD READER STRUCTURE

FIELD OF THE INVENTION

The present invention relates to a device for reading magnetic tape attached to a card and in particular to a card reader comprising improved reading/writing head suspension.

BACKGROUND OF THE INVENTION

With the development of information/data storage with magnetic means, cards with a magnetic tape fixed thereon to store data have been widely used, such as personal identification cards, credit cards, bank auto-teller cards and even driver's licenses. To access information/data stored in the magnetic tape attached to a card, a device to read and/or write data from/to the magnetic tape, which will be referred to as card reader, is very important in developing such a system.

The card readers currently available are classified into two types: read-only and read-and-write. The read-only card reader is only capable to read the magnetic tape on the card, while the read-and-write card reader is capable of both reading and writing operations. In a read-and-write card reader, the reading/writing operation is achieved by providing a roller which rotates in unison with the movement of the card through a card slot. An encoder is attached to the roller so that in the movement of the card through the card slot, the encoder generates encoding signals at every given distance of displacement of the card so as to instruct a write transducer to write data to correction locations on the magnetic tape. The locations of the magnetic tape on which the data are written have to be very precise, otherwise a read transducer would not be able to read the data correctly or the data density that the magnetic tape may have data stored thereon has to be decreased for read transducer reads the data at locations with a predetermined gaps therebetween.

A conventional read-and-write card reader is shown in FIGS. 5 and 6 of the attached drawings which comprises a base A on which two spaced walls W are mounted to define therebetween a card slot F through which a card is to be moved. A write transducer B and a read transducer H are suspended on one of the walls W by steel plates D and J to be partially project into the card slot F through openings formed on the wall W so that when the card is moved through the card slot F, the transducers B and H are capable to engage the magnetic tape on the card for writing and reading operations. An encoder G is mounted to the other one of the walls W by means of a cantilever arm C which has one end fixed to the other one of the walls W and another end free with the encoder G rotatably supported thereon. The encoder W is located so as to be opposite to the write transducer B and partially project into the card slot F to be engageable by the card in moving through the card slot F. The movement of the card drives the encoder W to rotate and thus generate desired encoding signal.

A disadvantage associated with the conventional card reader is that the cantilever arm C is subject to deflection due to the card forced into between the encoder G and the write transducer B which rotates the free end of the cantilever arm C on which the encoder G is supported an angle $\theta$ relative to the anchored end that is fixed to the wall W. Such a deflection angle $\theta$ causes error in the encoding operation for the deflection angle $\theta$ is the result of combination of movement of the encoder G in both a direction normal to the movement of the card and a direction parallel with the movement of the card and thus the position of the encoder G is changed by the insertion of the card between the encoder G and the write transducer B not only in the direction normal to the movement of the card, but also in the direction parallel with the movement of the card. The distance between two successive locations within the magnetic tape on which data are written is increased by the occurrence of the deflection angle $\theta$.

To reduce the negative influence of the deflection angle $\theta$, it has been suggested to increase the length of the cantilever arm C, as shown in prior art design of FIG. 7 of the attached drawings so as to reduce the position change in the direction of the movement of the card. This, however, is not possible to overcome such a problem.

Further, due to the cantilever type suspension of the encoder, the encoder is easily subject to the problem of vibration induced on the cantilever arm and the longer the cantilever arm, the more serious the vibration problem. Such a vibration may cause wearing and abrasion on the write transducer and the magnetic tape of the card.

It is therefore desired to provide a card reader which overcomes the problems encountered in the prior art card reader designs.

OBJECTS OF THE INVENTION

Therefore, the principal object of the present invention is to provide a card reader which overcomes the problems encountered in the prior art card readers.

Another object of the present invention is to provide a card reader wherein the encoder is not suspended by a cantilever arm and instead, the encoder is suspended by means of a spring plate which is anchored at both ends so as to make the encoder moveable in only a single direction normal to the movement of the card, but not in a direction parallel with the movement of the card.

A further object of the present invention is to provide a card reader wherein the encoder is suspended by a spring plate fixed at both ends so as to reduce the vibration caused thereon.

To achieve the above and other objects, there is provided a card reader comprising a base having formed thereon two spaced walls defining therebetween a card slot through which a card is movable. Both of the walls have two openings formed thereon to be opposite to each other. A write transducer and a read transducer are respectively suspended by a first biasing member to be located within the openings of one of the walls. A dummy transducer is also suspended by a first biasing member within one of the openings of the other wall. The dummy and read transducers are opposite to each other so as to provide a force and position to the card moved through therebetween. A roller co-axially mounted to and rotatable in unison with an encoder is rotatably supported by a second biasing member within the other opening of the other wall to be opposite to the write transducer to provide a force and position to the card moved through therebetween. The second basing member has two opposite ends each fixed to the wall with an end securing device so as to allow the rotational axis of the roller to be moved relative to the wall in a direction normal to the movement of the card, but not in a direction parallel with the movement of the card. All the first biasing members have two ends secured to the respective wall to make the write, read and dummy transducers movable relative to the wall in a direction normal to the movement of the card, but not in a direction parallel with the movement of the card.

The present invention will be better understood from the following description of preferred embodiments thereof with reference to the attached drawings, wherein:

BRIEF DESCRIPTION OF THE DRAWINGS

The present invention will be better understood from the following description of a preferred embodiment thereof with reference to the attached drawings, wherein.

DETAILED DESCRIPTION OF THE PREFERRED EMBODIMENT

Figure 1:
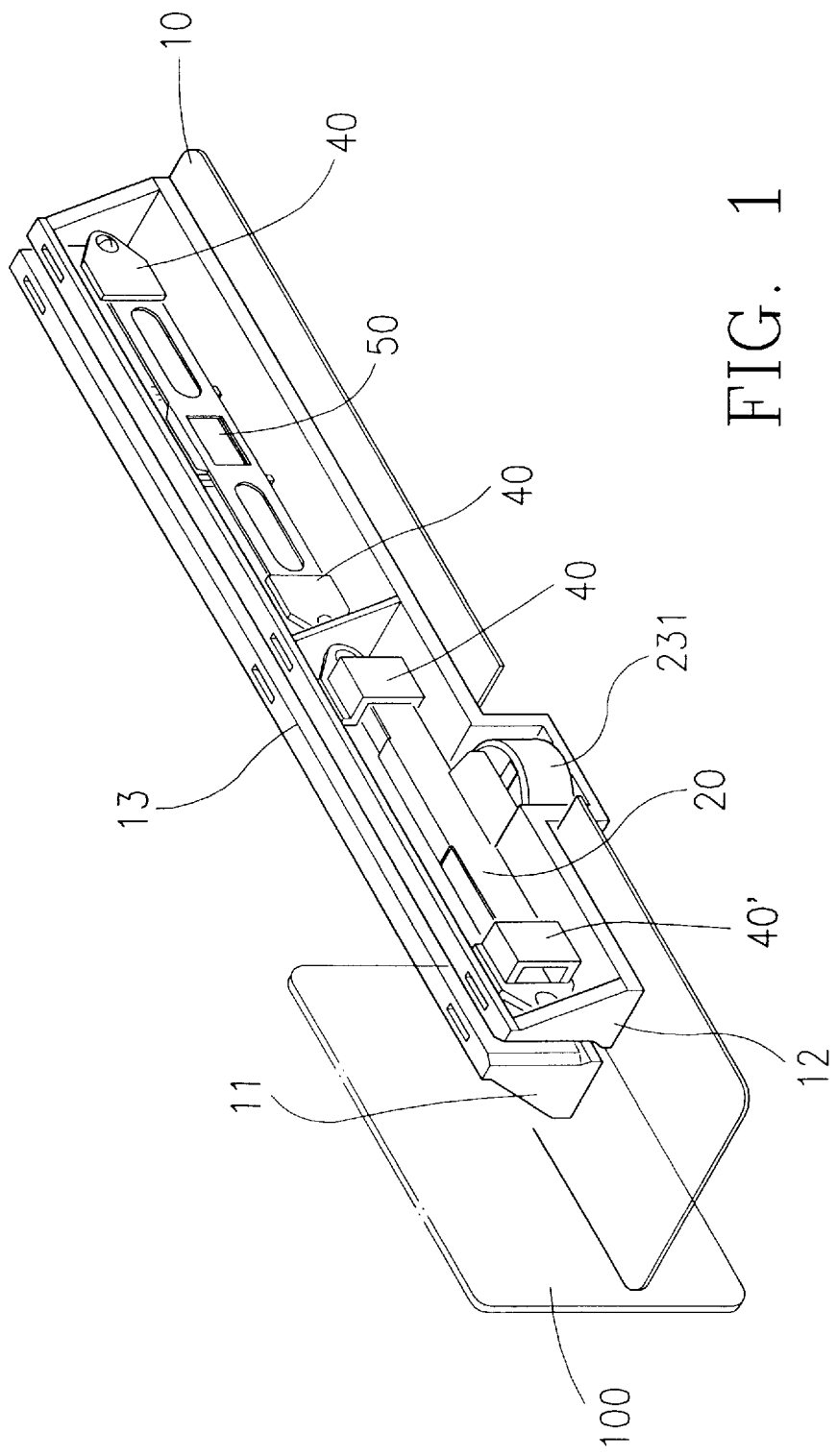
FIG. 1 is a perspective view showing a card reader constructed in accordance with the present invention.
Figure 2:
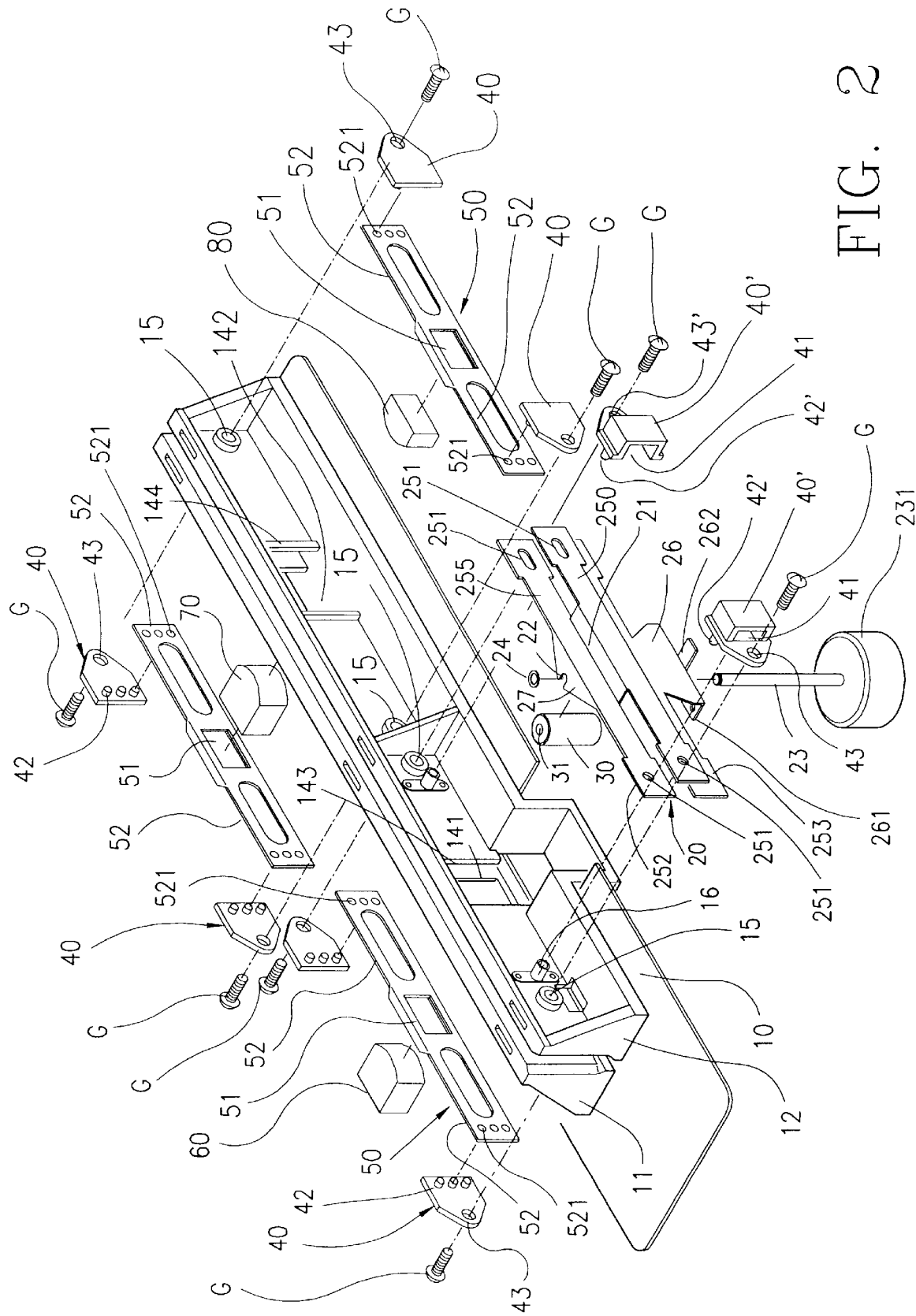
FIG. 2 is an exploded perspective view showing the card reader in accordance with the present invention.

With reference to the drawings and in particular to FIGS. 1 and 2, wherein a card reader adapted to read a magnetic tape attached to a card constructed in accordance with the present invention is shown, the card reader comprises a base 10 on which a first and a second upright walls 11 and 12 are mounted to be opposite to and spaced from each other defining therebetween a card passage or card slot 13 to allow the card which is shown in phantom lines in FIG. I and designated with reference numeral 100 with a section of magnetic tape (not shown) attached thereon to store information to pass therethrough. The base 10 comprises a substantially flat plate-like member having a length and a width and the walls 11 and 12 are mounted thereon in such a manner to be substantially normal thereto and extending in the length direction of the base 10 and spaced from each other in the width direction of the base 10.

The first wall 11 comprises a first opening 141 and a second opening 142, preferably spaced from each other in the length direction of the base 10. The second wall 12 comprises a third opening 143 and a fourth opening 144, respectively opposite to the first and second openings 141 and 142 of the first wall 11 and thus spaced from each other in the length direction of the base 10. Each of the first, second and fourth openings 141, 142 and 144 has a first biasing member 50 associated therewith. The third opening 143 has a second biasing member 20 associated therewith.

Each of the first biasing members 50 comprises an elongated spring plate extending in the length direction of the base 10 and facing the respective wall 11 or 12, having a central bore 51 opposite to and corresponding to the respective one of the first, second and fourth openings 141, 142 and 144 of the first and second walls 11 and 12 and two opposite spring suspension arms 52 extending from the central bore 51 in the length direction of the base 10 to define two opposite remote ends secured to the respective wall 11 or 12.

The first biasing member 50 associated with the first opening 141 of the first wall 11 comprises a write transducer 60 for writing to the magnetic tape of the card 100 received and retained within the central bore 51 so as to have the first biasing member 50 suspended by the two suspension arms 52 to partially project into the slot 13 to engage the magnetic tape of the card 100 for performing the write operation. The spring plate of the biasing member 50 allows the write transducer 60 to move relative to the first wall 11 in the width direction of the base 10.

To cooperate with the write transducer 60 in the write operation, a roller 30 is supported by the second biasing member 20 in such a manner to partially project through the third opening 143 of the second wall 12 and into the card slot 13 to be opposite to the write transducer 60 and preferably in contact engagement with the write transducer 60 (see FIG. 4) or with a gap smaller than the thickness of the card 100 formed therebetween. Wen the card 100 is moved through between the write transducer 60 and the roller 30 with the first biasing member 50 of the write transducer 60 and the second biasing member 20 deflected by the card 100 inserted into therebetween, the card 100 is provided with a position and force balance by both the first biasing member 50 of the write transducer 60 and the second biasing member 20 (see FIG. 3). The second biasing member 20 and the roller 30 will be further discussed.

The first biasing member 50 associated with the second opening 142 of the first wall 11 comprises a read transducer 70 for reading from the magnetic tape of the card 100 received and retained within the central bore 51 so as to have the read transducer 70 suspended by the suspension arms 52 to partially project into the slot 13 to engage the card 100 for reading operation. The spring plate of the biasing member 50 allows the read transducer 70 to move relative to the first wall 11 in the width direction of the base 10.

Figure 3:
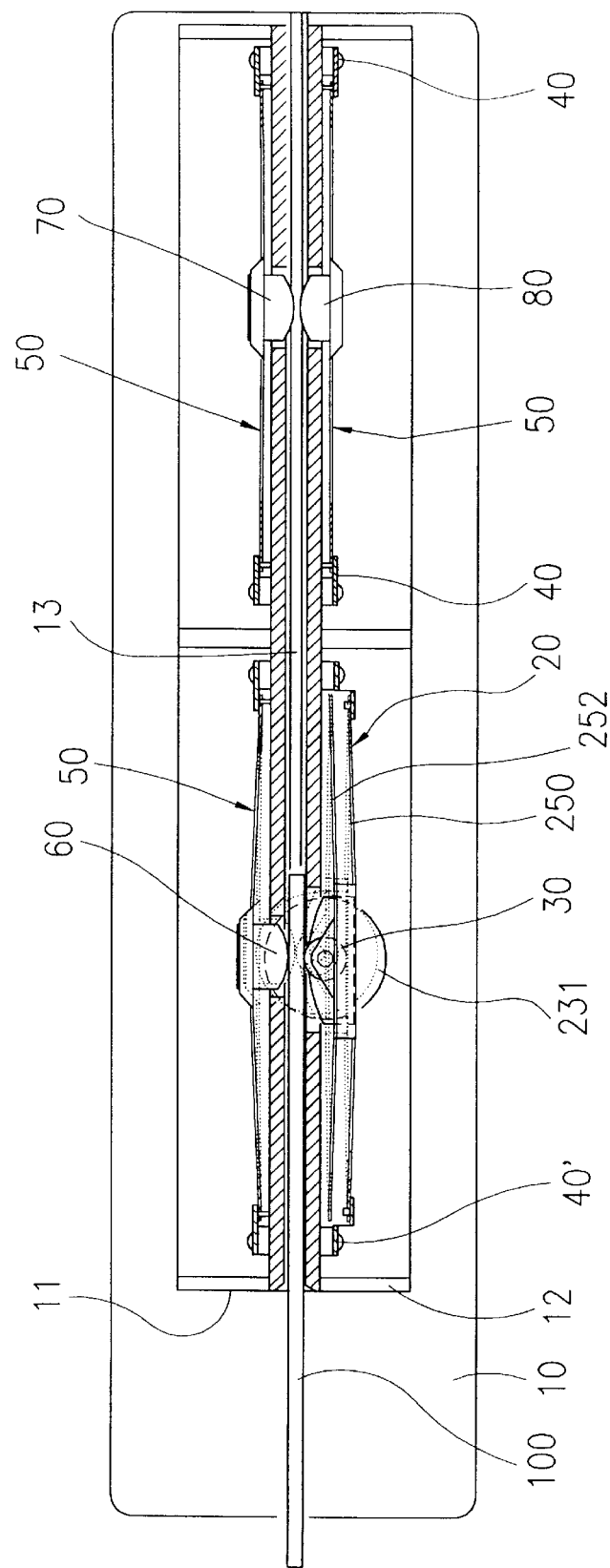
FIGS. 3 and 4 are top plan views showing the card reader of the present invention with a card moved through the card slot at different locations along the card slot.
Figure 4:
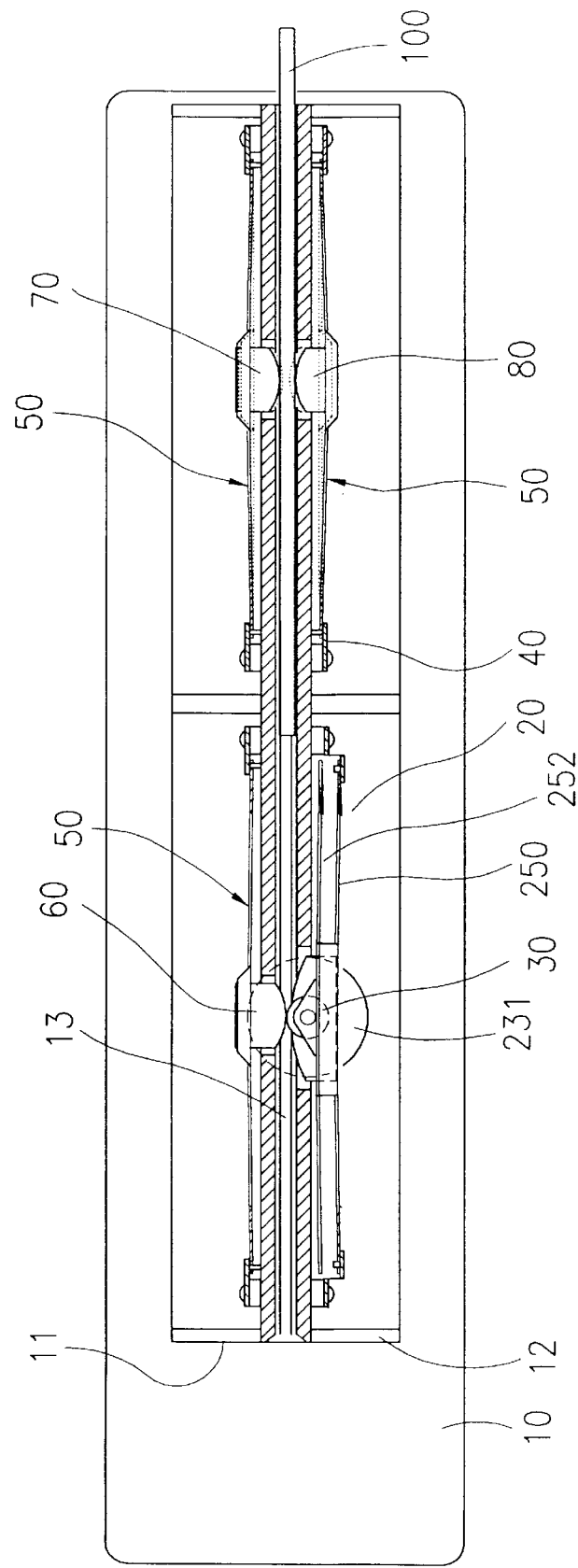
Figure 5:
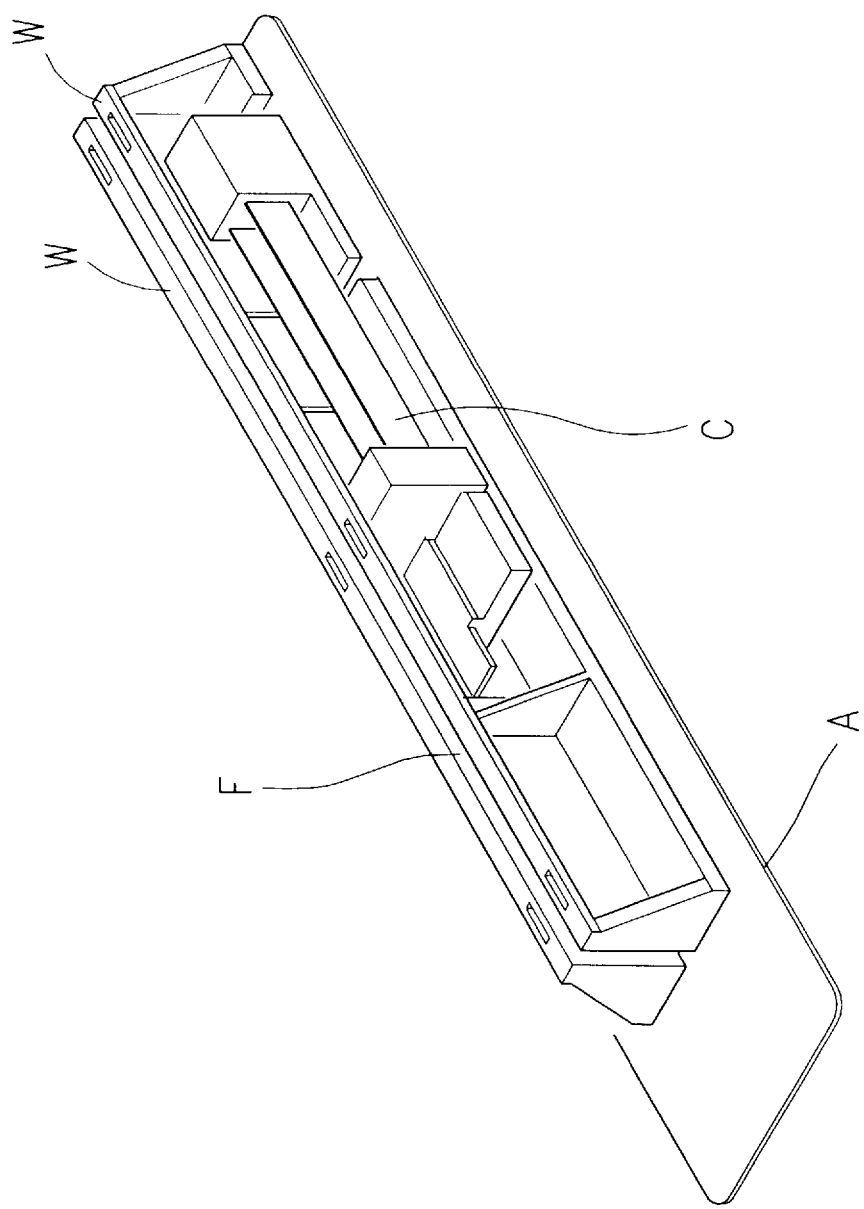
FIG. 5 is a perspective showing a prior art card reader.
Figure 6:
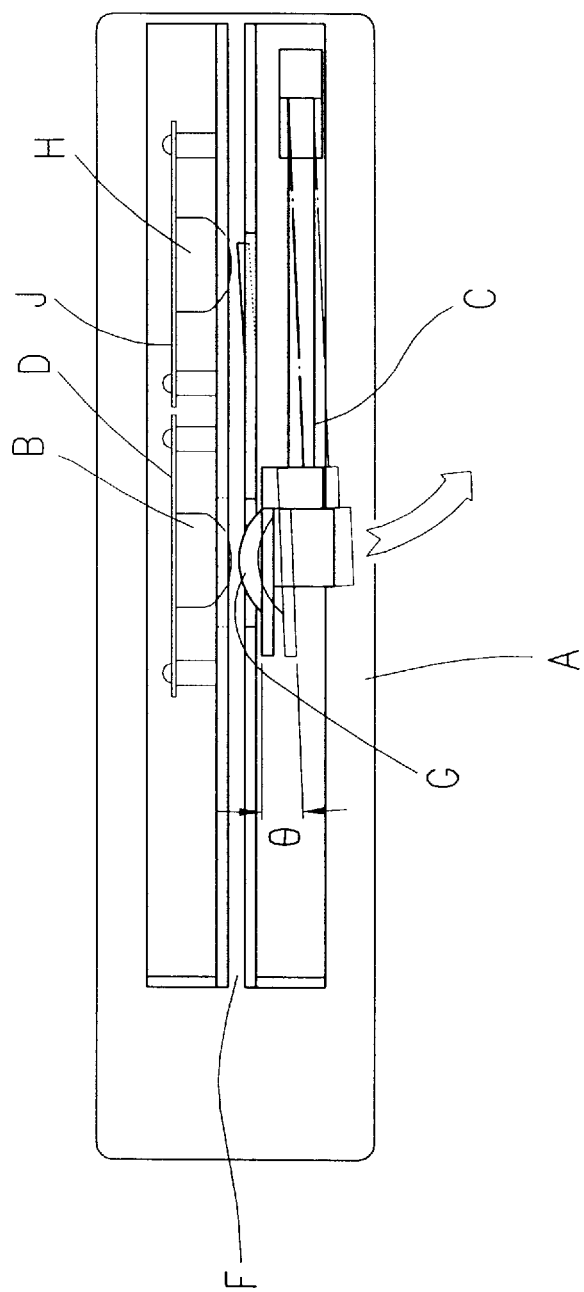
FIG. 6 is a top plan view of the prior art card reader shown in FIG. 5, illustrating the deflection of the suspension arm of the read/write head.
Figure 7:
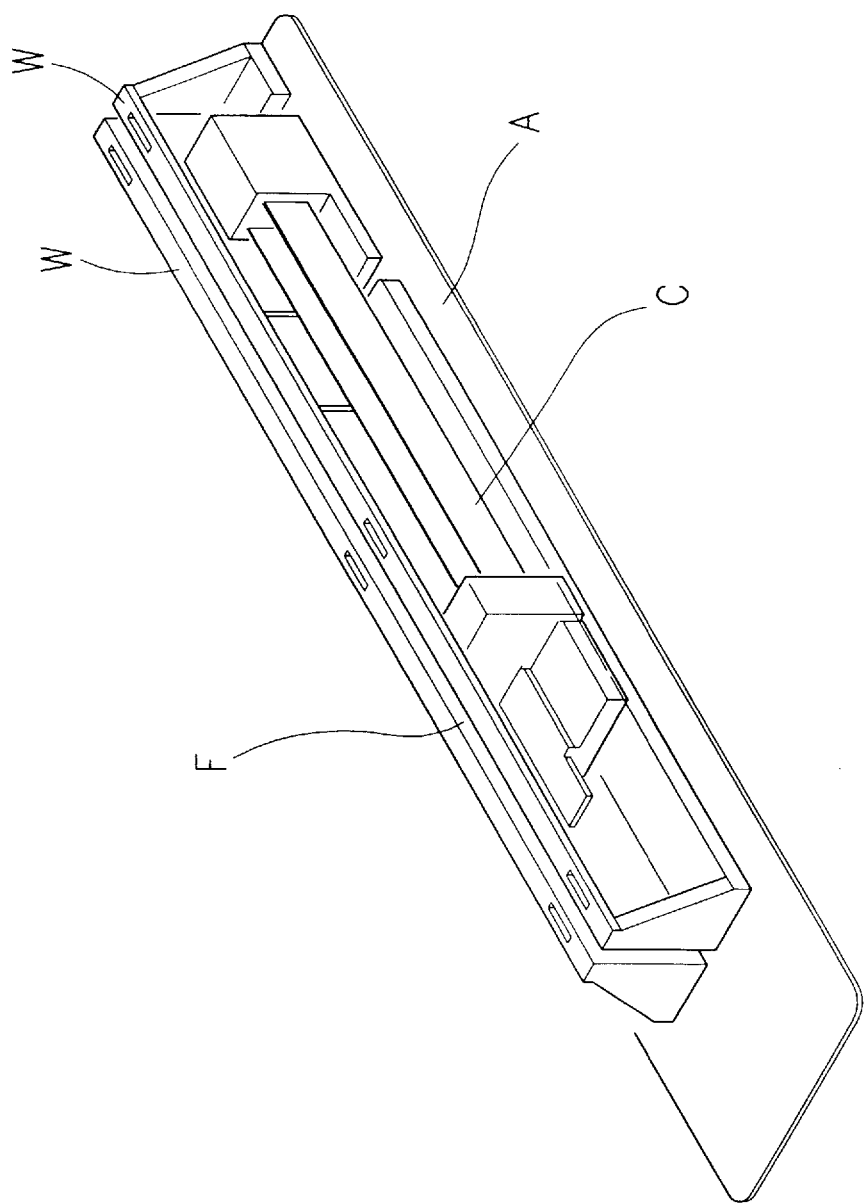
FIG. 7 is a perspective view showing another prior art card reader.

To be symmetric so as to provide the card 100 with a position and force balance in moving through the card slot 13, the first biasing member 50 associated with the fourth opening 141 of the first wall 11 comprises a dummy transducer 80, which is shaped and sized like the read transducer 70, received and retained in the central bore 51 and supported by the suspension arms 52 of the first biasing member 50 in such a manner to be partially project into the slot 13 similar to the read transducer 70 with a gap smaller than the thickness of the card 100 formed therebetween (see FIG. 3) so that when the card 100 is moved through between the read transducer 70 and the dummy transducer 80, the first biasing members 50 of both the read transducer 70 and the dummy transducer 80 are deflected and thus a position and force balance is provided to the card 100 between the read transducer 70 and the dummy transducer 80 (see FIG. 4).

Each of the first biasing members 50 has provided on the two opposite remote ends thereof with end securing means to secure the two ends to the associated wall 11 or 12 with the central bore 51 exactly opposite to the first, second or fourth opening 141, 142 or 143 and the write, read and dummy transducers 60, 70 and 80 suspended within the first, second and fourth openings 141, 142 and 143 by the first biasing members 50. The spring plates of the first biasing members 50 provide the write, read and dummy transducers 60, 70 and 80 with a suitable spring force to allow the write, read and dummy transducers 60, 70 and 80 to move relative to the walls 11 and 12 in the width direction and thus allowing the card 100 to pass through the card slot 13.

Further, in accordance with the present invention, the bore 51 of each of the first biasing members 50 is substantially centered on the spring plate with the end securing means on both ends of the spring plate identical to and symmetric to each other with respect to the bore 51 so that when the card 100 is moved through the card slot 13 and the associated write, read or dummy transducer 60, 70 or 80 is forced to moved away from the slot 13 in the width direction of the base 10, the symmetrical and identical securing means on both ends of the spring plate allows the write, read or dummy transducer 60, 70 or 80 to be moveable relative to the walls 11 and 12 in a direction substantially normal to the movement of card 100 (or the walls 1 and 12 or the length direction of the base 10), but not in a direction parallel with the movement of the card (or the wall 11 and 12) and no rotation occurs about the first and second directions, as indicated in FIG. 4. This keeps the write, read and dummy transducer 60, 70 or 80 in precise alignment with the magnetic tape of the card 100 for performing a correct data access on the magnetic tape.

The end securing means for securing each of the first biasing members 50 to the respective wall 11 or 12 comprises a plurality of apertures 521 (three apertures 521 in the preferred embodiment illustrated) formed on the remote end of each of the suspension arms 52 and preferably in alignment with each other in a direction normal to the base 10. A retainer plate 40 comprises a peg 42 formed thereon to be received within each of the apertures 521 of the suspension arm 52. The retainer plate 40 also comprises a hole 43 through which a bolt G extends to engage an inner-threaded hole 43 formed on the respective wall 11 or 12 so as to secure the remote end of the suspension arm 52 to the respective wall 11 or 12.

The second biasing member 20 comprises a top spring plate 252 and a bottom spring plate 253 extending in the length direction of the base 10, facing the second wall 12 and spaced from each other in the direction normal to the base 10 and a central spring plate 250 located between the top and bottom spring plates 252 and 253 and deviating therefrom in the width direction of the base 10 with a connection portion 21 between the top and central spring plates 252 and 250 and between the bottom and central spring plates 253 and 250 so as to define, together with the central spring plate 250, a lying down U shaped recess for rotatably receiving therein the roller 30. The top spring plate 252 has a transverse extension 27 substantially normal to and extending toward the second wall 12 with a notch 22 formed thereon. The bottom spring plate 253 has an extension 26 substantially parallel with the second wall 12 and extending toward the base 10 with a further transverse extension 261 extending therefrom toward the second wall 12. A recess (not shown) is provided on the transverse extension 261 to be opposite to the notch 22 of the top transverse extension 27.

An axle 23 having a top end rotatably retained within the notch 22 of the top transverse extension 27 by means of a retainer ring 24 and a bottom end rotatably received within the recess on the bottom transverse extension 261 extends through a central bore 31 of the roller 30 in a tight fitting manner so as to be rotatable with the roller 30. An encoder 231 is co-axially fixed to the axle 23 so that when the roller 30 is in engagement the card 100 during the movement of the card 100 through the card slot 13, the roller 30 is driven to rotate by the movement of the card 100 and the rotation of the roller 30 is transmitted to the encoder 231 via the axle 23 to perform an encoding operation so as to allow the write transducer 60 to correctly access the magnetic tape of the card 100.

Each of the spring plates 250, 252 and 253 of the second biasing member 20 comprises two suspension arms 255 extending in opposite direction along the length of the base 10, each having a remote end anchored to the second walls 12 by means of an end securing device. The end securing device comprises an aperture 251 formed on the remote end of each of the suspension arms 255 and a retainer member 40' associated with each of the two ends of the second biasing member 50 having a U-shaped configuration corresponding the U-shaped arrangement of the spring plates 250, 252 and 253 of the second biasing member 20 with a recess 41 to receive the central spring plate 250 therein, having a peg 42' received in the aperture 251 of each of the suspension arms 255. The retainer member 40' is also provided with a hole 43' through which a bolt G extends to engage an inner-threaded hole 15 formed on the second wall 12. To accommodate the recess 41 of the retainer member 40', the second wall 12 is provided with a cylinder 16 which holds the central spring plate 250 within the recess 41 of the retainer member 40'.

The two end anchored configuration of the second biasing member 20 allows the roller 30 and the encoder 231 to be only movable in a direction normal to the movement of the card 100 (namely, the width direction of the base 10), but not in a direction parallel with the movement of the card 100, see FIGS. 3 and 4.

It is apparent that although the present invention is illustrated with the description of the preferred embodiment, it is contemplated that there may be changes and modifications in the described embodiment that can be carried out without departing from the scope of the invention which is intended to be limited only by the appended claims.

What is claimed is:

1. A card reader adapted to access a magnetic tap attached to a card, comprising:

a base comprising a plate member having a length along a first axis define a first direction and a width along a second axis defining a second direction;

a first wall and a second wall extending along the first direction and mounted on the plate member to be opposite to and spaced from each other in the second direction to define therebetween a slot for movement of the card therethrough, the first wall having a first opening and a second opening formed thereon, the second wall having a third opening and a fourth opening formed thereon and respectively opposite to the first and second openings of the first wall;

a write transducer assembly comprising a write transducer supported by a write transducer biasing member attached to the first wall to partially project through the first opening and into the slot to engage the card in writing to the magnetic tape during the movement of the card, the write transducer biasing member being so configured and attached to the first wall to allow the write transducer to be only moveable relative to the first wall with translation in the second direction and no rotation about the first and second axes;

a read transducer assembly comprising a read transducer supported by a read transducer biasing member attached to the first wall to partially project through the second opening and into the slot to engage the card in reading from the magnetic tape during the movement of the card, the read transducer biasing member being so configured and attached to the first wall to allow the read transducer to be only moveable relative to the first wall with translation in the second direction and no rotation about the first and second axes;

a dummy transducer assembly comprising a dummy transducer supported by a dummy transducer biasing member attached to the second wall to partially project through the fourth opening and into the slot to engage the card in a manner opposite to and symmetric to the read transducer in reading from the magnetic tape during the movement of the card so as to provide the card with position and force balance in moving through between the read transducer and dummy transducer, the dummy transducer biasing member being so configured and attached to the second wall to allow the dummy transducer to be only moveable relative to the second wall with translation in the second direction and no rotation about the first and second axes; and an encoder assembly comprising an encoder and a roller attached to the encoder to be rotatable in unison therewith, the roller being supported by a roller biasing member attached to the second wall to partially project through the third opening and into the slot to engage the card in a manner opposite to the write transducer in writing to the magnetic tape during the movement of the card so as to provide the card with position and force balance in moving through between the write transducer and the roller and to allow the roller to be rotatable with the movement of the card through the slot, the roller biasing member being so configured and attached to the second wall to allow the roller to be only moveable relative to the second wall with translation in the second direction and no rotation about the first and second axes.

2. The card reader as claimed in claim 1, wherein the write transducer biasing member comprises an elongated spring plate facing the first wall and having a central bore to receive and retain therein the write transducer and two suspension arms extending from the central bore in opposite directions along the first axis, each of the suspension arms having a remote end secured to the first wall with end securing means so as to suspend the write transducer in the first opening of the first wall to allow the write transducer to be only movable in a translation manner in the second direction.

3. The card reader as claimed in claim 2, wherein the end securing means comprises a plurality of apertures formed on the remote end of each of the suspension arms and a retainer plate having a plurality of pegs formed thereon to be received in the apertures, the retainer plate having a hole through which a bolt extends to engage an inner-threaded hole formed on the first wall so as to secure the remote end of the suspension arm to the first wall.

4. The card reader as claimed in claim 1, wherein the read transducer biasing member comprises an elongated spring plate facing the first wall and having a central bore to receive and retain therein the read transducer and two suspension arms extending from the central bore in opposite directions along the first axis, each of the suspension arms having a remote end secured to the first wall with end securing means so as to suspend the read transducer in the second opening of the first wall to allow the read transducer to be only movable in a translation manner in the second direction.

5. The card reader as claimed in claim 4, wherein the end securing means comprises a plurality of apertures formed on the remote end of each of the suspension arms and a retainer plate having a plurality of pegs formed thereon to be received in the apertures, the retainer plate having a hole through which a bolt extends to engage an inner-threaded hole formed on the first wall so as to secure the remote end of the suspension arm to the first wall.

6. The card reader as claimed in claim 1, wherein the dummy transducer biasing member comprises an elongated spring plate facing the second wall and having a central bore to receive and retain therein the dummy transducer and two suspension arms extending from the central bore in opposite directions along the first axis, each of the suspension arms having a remote end secured to the second wall with end securing means so as to suspend the dummy transducer in the fourth opening of the second wall to allow the dummy transducer to be only movable in a translation manner in the second direction.

7. The card reader as claimed in claim 6, wherein the end securing means comprises a plurality of apertures formed on the remote end of each of the suspension arms and a retainer plate having a plurality of pegs formed thereon to be received in the apertures, the retainer plate having a hole through which a bolt extends to engage an inner-threaded hole formed on the second wall so as to secure the remote end of the suspension arm to the second wall.

8. The card reader as claimed in claim 1, wherein the roller biasing member comprises a bottom and a top elongated spring plates extending in the first direction, facing the second wall and spaced from each other in a direction normal to plate member of the base and a central elongated spring plate extending in the first direction, facing the second wall and disposed between the top and bottom spring plates in the direction normal to the base, but deviating therefrom in the second direction so as to be away from the second wall, a connection portion being provided between the top and the central spring plates and between the bottom and the central spring plates so as to define, together with the central spring plate, a lying down U shaped recess in which the roller is rotatably received and supported by an axle extending through and fixed to the roller and having two ends rotatably mounted to the top and bottom spring plates.

9. The card reader as claimed in claim 8, wherein the top spring plate comprises a transverse extension substantially normal thereto with a notch formed thereon to receive and retain therein a top one of the two ends of the axle by means of a retainer ring and wherein the bottom spring plate comprises an extension substantially parallel with the second wall and extending toward the base with a further transverse extension substantially normal thereto, a cutout being provided on the further transverse extension to receive a bottom one of the ends of the axle therein.

10. The card reader as claimed in claim 8, wherein the roller comprises a cylindrical member with a central bore to be tightly fit over and thus fixed on the axle to be rotatable in unison therewith.

11. The card reader as claimed in claim 10, wherein the axle extends along a rotational axis of the encoder so as to have the roller rotatable in unison with the encoder.

12. The card reader as claimed in claim 8, wherein each of the top, bottom and central spring plates of the roller biasing member comprises two spring arms extending from the connection portions in opposite directions along the first axis to each define a remote end, an end securing device being provided to secure the remote ends of the suspension arms to the second wall in such a manner to allow the roller to partially projection into the slot through the third opening of the second wall to engage the card so as to provide the card with position balance in the movement of the card is moved through between the roller and the write transducer and to allow the roller and thus the encoder to be rotatable with the movement of the card through the slot.

13. The card reader as claimed in claim 12, wherein the end securing device comprises an aperture formed on the remote end of each of the suspension arms of the roller biasing member and a retainer member having a U shape corresponding to the U shaped arrangement of the top, bottom and central spring plates and comprising a pegs corresponding to and received within the aperture of each of the spring plates, the retainer member having a hole through which a bolt extends to engage an inner-threaded hole formed on the second wall so as to secure the roller biasing member to the second wall.

* * * * *